United States Patent
Schuell et al.

(10) Patent No.: US 12,129,406 B2
(45) Date of Patent: Oct. 29, 2024

(54) SILOXANE-BASED GEL ADHESIVES AND ARTICLES

(71) Applicant: 3M INNOVATIVE PROPERTIES COMPANY, St. Paul, MN (US)

(72) Inventors: Christoph T. R. Schuell, Neuss (DE); Audrey A. Sherman, Woodbury, MN (US); Junkang J. Liu, Woodbury, MN (US); Siegfried K. Welke, Erkrath (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 671 days.

(21) Appl. No.: 17/414,392

(22) PCT Filed: Dec. 17, 2019

(86) PCT No.: PCT/IB2019/060946
§ 371 (c)(1),
(2) Date: Jun. 16, 2021

(87) PCT Pub. No.: WO2020/128851
PCT Pub. Date: Jun. 25, 2020

(65) Prior Publication Data
US 2022/0049099 A1   Feb. 17, 2022

Related U.S. Application Data

(60) Provisional application No. 62/782,431, filed on Dec. 20, 2018.

(51) Int. Cl.

| | |
|---|---|
| *C09J 183/04* | (2006.01) |
| *C08F 230/08* | (2006.01) |
| *C08G 77/442* | (2006.01) |
| *C08K 5/14* | (2006.01) |
| *C08L 83/04* | (2006.01) |
| *C08L 83/10* | (2006.01) |
| *C09J 7/35* | (2018.01) |
| *C09J 7/38* | (2018.01) |
| *C09J 9/00* | (2006.01) |

(52) U.S. Cl.
CPC ......... *C09J 183/04* (2013.01); *C08F 230/085* (2020.02); *C08G 77/442* (2013.01); *C08K 5/14* (2013.01); *C08L 83/04* (2013.01); *C08L 83/10* (2013.01); *C09J 7/35* (2018.01); *C09J 7/38* (2018.01); *C09J 9/00* (2013.01); *C08L 2203/02* (2013.01); *C08L 2205/025* (2013.01); *C08L 2205/03* (2013.01); *C08L 2312/06* (2013.01); *C09J 2301/302* (2020.08); *C09J 2301/304* (2020.08)

(58) Field of Classification Search
CPC .... C08L 83/10; C08L 2205/025; C09J 183/10
See application file for complete search history.

(56) References Cited

U.S. PATENT DOCUMENTS

| | | | | |
|---|---|---|---|---|
| 3,528,940 A | * | 9/1970 | Modic | C09J 183/10 |
| | | | | 524/588 |
| 3,645,835 A | | 2/1972 | Hodgson | |
| 3,786,116 A | | 1/1974 | Milkovich | |
| 3,842,059 A | | 1/1974 | Milkovich | |
| 4,595,001 A | | 6/1986 | Potter | |
| 4,655,767 A | * | 4/1987 | Woodard | A61K 9/7069 |
| | | | | 428/156 |
| 4,693,935 A | | 9/1987 | Mazurek | |
| 4,838,253 A | | 6/1989 | Brassington | |
| 5,088,483 A | | 2/1992 | Heinecke | |
| 5,160,315 A | | 11/1992 | Heinecke | |
| 5,891,076 A | | 4/1999 | Fabo | |
| 6,051,747 A | | 4/2000 | Lindqvist | |
| 7,407,709 B2 | | 8/2008 | Zhou | |
| 7,807,268 B2 | | 10/2010 | Zhou | |
| 9,359,529 B2 | * | 6/2016 | Liu | C09J 7/38 |
| 2010/0331785 A1 | | 12/2010 | Fabo | |
| 2011/0212325 A1 | | 9/2011 | Determan | |
| 2011/0300296 A1 | | 12/2011 | Sherman | |
| 2018/0148517 A1 | | 5/2018 | Sherman | |
| 2021/0095172 A1 | * | 4/2021 | Liu | C09J 183/04 |
| 2021/0246339 A1 | * | 8/2021 | Lu | C08K 5/544 |

FOREIGN PATENT DOCUMENTS

| | | | |
|---|---|---|---|
| EP | 0255226 A2 | * | 2/1988 |
| EP | 2599847 | | 6/2013 |
| JP | 63-291971 | * | 11/1988 |

(Continued)

OTHER PUBLICATIONS

Machine translation of JP 63-291971 (no date).*

(Continued)

*Primary Examiner* — Marc S Zimmer

(57) ABSTRACT

Siloxane-based gel adhesives with improved shear holding power are prepared from curable compositions. The curable compositions include a siloxane fluid with a viscosity of at least 1,000,000 centiPoise, a siloxane-(meth)acrylate copolymer, and siloxane tackifying resin. The curable compositions can contain an initiator or can be cured by e-beam radiation without an initiator. The siloxane-(meth)acrylate copolymer is the reaction product of a reaction mixture of an ethylenically unsaturated siloxane-containing macromer, an alkyl (meth)acrylate monomer; optionally a reinforcing monomer, and an initiator.

21 Claims, No Drawings

(56) References Cited

FOREIGN PATENT DOCUMENTS

| WO | WO 2010-056541 | 5/2010 | | |
|---|---|---|---|---|
| WO | WO 2010-056543 | 5/2010 | | |
| WO | WO 2010-056544 | 5/2010 | | |
| WO | WO 2010-124187 | 10/2010 | | |
| WO | WO-2014151464 A1 * | 9/2014 | ............. | A61K 47/34 |
| WO | WO-2016123418 A1 * | 8/2016 | ............. | A61K 47/24 |
| WO | WO 2018-017554 | 1/2018 | | |
| WO | WO-2018193350 A1 * | 10/2018 | ............. | C09J 11/08 |
| WO | WO 2019-193514 | 10/2019 | | |
| WO | WO 2020-136614 | 7/2020 | | |

OTHER PUBLICATIONS

Kawakami, "Silicone Macromers for Graft Polymer Synthesis", Polymer Journal, Nov. 1982, vol. 14, No. 11, pp. 913-917.
Kawakami, "Synthesis and Copolymerization of Polysiloxane Macromers", ACS Polymer Preprints, Apr. 1984, vol. 25, No. 1, pp. 245-246.
Kawakami, "Synthesis of Silicone Graft Polymers and A Study of Their Surface-Active Properties", Macromolecular Chemistry and Physics, Jan. 1984, vol. 185, No. 1, pp. 9-18.
International Search Report for PCT International Application No. PCT/IB2019/060946, mailed on Mar. 3, 2020, 4 pages.

* cited by examiner

SILOXANE-BASED GEL ADHESIVES AND ARTICLES

FIELD OF THE DISCLOSURE

This disclosure relates to siloxane-based gels that may be used to form adhesive articles, such as tapes and other medical articles useful in medical applications.

BACKGROUND

A wide range of adhesive articles are used in medical applications. These adhesive articles include gels used to attach electrodes and other sensing devices to the skin of a patient, a wide range of tapes to secure medical devices to a patient, and adhesive dressings used to cover and protect wounds.

Many of the adhesive articles use pressure sensitive adhesives. Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers, and silicones.

One problem with using adhesive articles for medical applications is that the removal of adhesive article can cause trauma to the skin. This is particularly troublesome in patients with sensitive skin, such as infants and the elderly, and can become severe with chronic patients where adhesive articles are repeatedly attached and removed over a long-term period.

Various attempts have been made to mitigate this problem with adhesive articles. In particular, health care professionals utilize removal techniques to mitigate skin trauma. One way to mitigate trauma to the skin is to remove the adhesive article using a slow peel at a high angle to avoid stretching the skin. Another way to mitigate trauma, when the adhesive article is stretchable, is to pull straight out (as close to a 0° angle as possible) to induce stretch releasing of the adhesive layer from the skin. Also, manufactures of adhesive articles have developed articles that mitigate skin trauma by reducing adhesion to skin. So called "gentle-to-skin adhesives" have been developed that do not strip off skin cells significantly when removed.

A variety of gentle-to-skin articles and dressings that use gentle-to-skin adhesives have been described. A gentle-to-skin adhesive is described in US Patent Publication No. 2011/0212325 (Determan et al.) which describes an electron beam and gamma radiation crosslinked silicone gel adhesive that may use either nonfunctional or functional poly diorganosiloxanes. In U.S. Pat. No. 4,838,253 (Brassington, et al.), a silicone gel coated dressing is described. In U.S. Pat. No. 6,051,747 (Lindqvist, et al.), a foam absorbent dressing is described wherein the foam dressing is coated with a layer of hydrophobic gel. Also, U.S. Pat. No. 5,891,076 (Fabo) describes a hypertrophic scar dressing that includes silicone-gel on that side of the dressing which lies against the user's skin and a flexible carrier sheet embodied within the silicone-gel such that the gel forms continuous layers on both sides of the carrier, and US Patent Publication No. 2010/0331785 (Fabo et al.) describes a dressing that includes a liquid impermeable film layer coated with a skin friendly adhesive on the side intended to adhere to the skin.

SUMMARY

This disclosure relates to siloxane-based gels that may be used to form adhesive articles, such as tapes and other medical articles useful in medical applications. The disclosure includes curable compositions that form gel adhesives upon curing, articles comprising the gel adhesives, and methods of preparing article comprising the gel adhesives.

Disclosed herein are curable compositions comprising a siloxane fluid with a viscosity of at least 1,000,000 centiPoise, a siloxane-(meth)acrylate co-polymer, and siloxane tackifying resin. In some embodiments the composition may further comprise an initiator, in other embodiments the composition does not comprise an initiator, but is e-beam curable in the absence of an initiator. The siloxane-(meth)acrylate copolymer comprises the reaction product of a reaction mixture comprising at least one ethylenically unsaturated siloxane-containing macromer, at least one alkyl (meth)acrylate monomer; optionally a reinforcing monomer, and an initiator.

Also disclosed are gel adhesive articles comprising a substrate with a first major surface and a second major surface, and a siloxane-based gel adhesive composition disposed on at least a portion of the first major surface of the substrate. The siloxane-based gel adhesive composition comprises the cured reaction product of a curable composition comprising a siloxane fluid with a viscosity of at least 1,000,000 centiPoise, a siloxane-(meth)acrylate co-polymer, and siloxane tackifying resin, as described above. Typically, the substrate comprises a polymeric film, a fabric, a nonwoven, a foam, a paper, a mesh, an adhesive, or a release liner.

Methods for preparing the gel adhesive articles of this disclosure comprise providing a substrate with a first major surface and a second major surface, providing a curable composition that upon curing forms a siloxane-based gel adhesive composition, disposing the curable composition on at least a portion of the first major surface of the substrate, and curing the curable composition to form siloxane-based gel adhesive. The curable composition comprises a siloxane fluid with a viscosity of at least 1,000,000 centiPoise, a siloxane-(meth)acrylate co-polymer and siloxane tackifying resin, as described above. In some embodiments, the curable composition may further comprise an initiator and curing comprises exposing the curable composition to actinic radiation or heat to trigger the initiator, in other embodiments, the curable composition is cured by exposure to e-beam radiation.

DETAILED DESCRIPTION

The use of adhesive products in the medical industry has long been prevalent, and is increasing. However, while adhesives and adhesive articles have shown themselves to be very useful for medical applications, there are also issues in the use of adhesives and adhesive articles. Medical adhesive-related skin injury (MARSI) has a significant negative impact on patient safety. Skin injury related to medical adhesive usage is a prevalent but under recognized complication that occurs across all care settings and among all age groups. In addition, treating skin damage is costly in terms of service provision, time, and additional treatments and supplies.

Skin Injury occurs when the superficial layers of the skin are removed along with the medical adhesive product, which not only affects skin integrity but can cause pain and the risk of infection, increase wound size, and delay healing, all of which reduce patients' quality of life.

Medical adhesive tape can be simply defined as a pressure-sensitive adhesive and a backing that acts as a carrier for the adhesive. The US Food and Drug Administration more specifically defines a medical adhesive tape or adhesive bandage as "a device intended for medical purposes that consists of a strip of fabric material or plastic, coated on one side with an adhesive, and may include a pad of surgical dressing without a disinfectant. The device is used to cover and protect wounds, to hold together the skin edges of a wound, to support an injured part of the body, or to secure objects to the skin."

While the pathophysiology of MARSI is only partially understood, skin injury results when the skin to adhesive attachment is stronger than skin cell to skin cell attachment. When adhesive strength exceeds the strength of skin cell to skin cell interactions, cohesive failure occurs within the skin cell layer.

The intrinsic characteristics of all components of an adhesive product must then be taken into account to address these factors that may lead to MARSI. Properties of the adhesive to be considered include cohesiveness over time and the corresponding adhesion strength; properties of the tape/backing/dressing to be considered include breathability, stretch, conformability, flexibility, and strength.

The widespread use of adhesives in medical applications has led to the development of adhesives and adhesive articles that are gentle to the skin. Some of these adhesives are pressure sensitive adhesives and others are gel adhesives. The application of pressure sensitive adhesives, including silicone pressure sensitive adhesives, for adhering to skin is known in the art and many examples are commercially available. However, some pressure sensitive adhesives have issues that limit their use for adhesion to skin. For instance, skin damage may result during the removal of a pressure sensitive adhesive that exhibits surface adhesion to skin that is too high. Alternatively, if the surface adhesion to skin is reduced, the pressure sensitive adhesive may lack sufficient holding power to be useful. Additionally, some pressure sensitive adhesives that are relatively rigid or non-conformable compared to skin typically result in considerable patient discomfort during use. Also, even adhesives that have a measured low peel adhesion to skin may cause discomfort during removal, e.g., if the adhesive becomes surface attached around hair.

Another class of adhesives used in medical applications are silicone gels. As used herein, the terms "siloxane" and "silicone" are used interchangeably. The term siloxane is replacing silicone in common usage, but both terms are used in the art. Silicone gel (crosslinked poly dimethylsiloxane ("PDMS")) materials have been used for dielectric fillers, vibration dampers, and medical therapies for promoting scar tissue healing. Commercially available silicone gels are soft, tacky, elastic materials that comprise relatively high levels of fluids (liquids). Silicone gels are typically softer than silicone pressure sensitive adhesives, resulting in less discomfort when adhered to and removed from skin. The combination of low skin trauma upon removal and low skin irritation upon wearing, make silicone gels suitable for gentle to skin adhesive applications.

Examples of commercially available silicone gel adhesive systems include products marketed with the trade names: Dow Corning MG 7-9850, WACKER 2130, BLUESTAR 4317 and 4320, and NUSIL 6345 and 6350. These gentle to the skin adhesives are formed by an addition cure reaction between vinyl-terminated PDMS and hydrogen terminated PDMS, in the presence of a hydrosilylation catalyst (e.g., platinum complex). Vinyl-containing and hydrogen-containing PDMS chains are referred to as 'functionalized' silicones due to their specific curable chemical moieties. Individually, such functional silicones are generally not reactive; however, together they form a reactive silicone system. Generally, due to processing requirements such as the need to be solventless, the desired formulation lifetime, and the reaction kinetics of the curing reactions, these reactive siloxane systems typically use functional PDMS fluids with low viscosities and thus low molecular weights. Additionally, silicone resins (tackifiers sometimes referred to as "silicate resins") and PDMS with multiple hydrogen functionalities (crosslinkers) can be formulated to modify the adhesive properties of the gel.

There are downsides to the use of these types of materials. For example, they required the use of specialized "functionalized" silicone materials. Also, they typically require the use of a catalyst, often a heavy metal-containing catalyst such as platinum or palladium catalysts. These catalysts are expensive and leave heavy metal-containing residues in the cured compositions. An alternative to the catalyst-promoted curing of such silicone materials is the use of free radical polymerization to cure or crosslink the silicone pressure sensitive adhesive or gel formulations. These polymerizations require initiation by a free radical source, such as, for example, the high temperature degradation of organic peroxides. However, organic peroxides can be unstable and even explosive and thus can be undesirable. Also, these cured materials, while they may be gentle to the skin, they generally have low adhesive holding power and low skin adhesion. Low skin adhesion and low adhesive holding power is often the trade off to achieve low skin trauma adhesives.

Recently siloxane-based gel adhesives and sealants have been prepared that cure and crosslink at room temperature without generating undesirable catalyst or initiator residues and do not require specialized functionalized starting materials, rather they are prepared either from silanol-functional siloxane materials or siloxane materials without any reactive functional groups. These siloxane-based gel compositions can be formed by a condensation reaction in the case of silanol-functional materials, or by the generation of free radicals by exposure to an electron beam (e-beam) or gamma radiation in the case of siloxane materials without any reactive functional groups. In the condensation reaction, two silanol groups (that is to say, terminal —SiOH groups) condense to form —Si—O—Si— linkages and a molecule of water ($H_2O$).

These siloxane-based gel adhesives and sealants have excellent wetting and flow characteristics, due to the very low glass transition temperature (Tg) and modulus of the polysiloxane network and achieve their adhesive holding power on the rough skin surface due to mechanical interlock and energy dissipation within the gel adhesive. Additionally, the low surface adhesion of silicone gels prevents the adhesive from tightly attaching to hair or skin cells during skin wear, further reducing the instance of pain during removal. This results in minimal to no skin trauma upon removal.

Thus, the use of pressure sensitive adhesives in medical applications have issues because they can have good adhesion to a wide variety of substrates (for example, to skin as well as to tubing, drapes, tape backings, and the like) but they can cause skin damage. Gel adhesives on the other hand can have desired low skin trauma, but these adhesives also have low adhesion, both to skin and to other substrates such as tubing, drapes, tape backings, and the like. Thus, the need remains for adhesives suitable for medical uses that have high adhesion to a wide range of substrates without causing skin damage.

An additional issue with adhesives for medical uses that are designed to adhere to skin without causing skin damage, is that these same medical adhesives are often required to have properties beyond adhesion. In particular, shear adhesion also called shear holding power, is a feature that is not only desirable, but also is required for many medical adhesives. Shear holding power relates to the ability to hold a static weight under shear force. Typically, this property is measured by applying an adhesive article such as a tape to vertical surface and hanging a weight from the adhered tape, and measuring the time it takes for the weight to drop. This testing criterion is described in, for example, ASTM test method D 3654-88 "Standard Test Method for Holding Power of Pressure-Sensitive Tapes".

It is a well understood tenet of adhesive science that there is an inverse relationship between adhesion and shear strength. Namely, increasing adhesive strength (such as peel adhesion strength) tends to diminish shear strength, and vice versa. Much of adhesive formulation technology has involved the balance of these features to arrive at the desired mix of properties-sufficiently high adhesive strength and shear strength. Medical adhesives have the added complicating feature of adhesion to skin without causing damage. Thus, there remains the need for medical adhesives that have high adhesion without causing skin damage and also have high shear strength.

The present disclosure includes gel adhesive compositions, gel adhesive articles and methods of making gel adhesive articles. The gel adhesive compositions are prepared from curable compositions that comprise a siloxane fluid with a viscosity of at least 1,000,000 centiPoise, a siloxane-(meth)acrylate co-polymer, and a siloxane tackifying resin. These curable compositions, upon curing, form gel adhesives have the desirable mix of properties of high adhesion without causing skin damage and high shear holding power.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives and gel adhesives.

Pressure sensitive adhesive compositions are well known to those of ordinary skill in the art to possess properties including the following: (1) aggressive and permanent tack, (2) adherence with no more than finger pressure, (3) sufficient ability to hold together two adherends, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "gel adhesive" refers to a tacky semi-solid crosslinked matrix containing a liquid or a fluid that is capable of adhering to one or more substrates. Fluid as used herein refers to materials that flow and includes not only liquids but also gums. The gel adhesives may have some properties in common with pressure sensitive adhesives, but they are not pressure sensitive adhesives.

The term "siloxane or siloxane-based" as used herein refers to polymers that contain units with dialkyl or diaryl siloxane ($-SiR_2O-$) repeating units. The siloxane-based polymers may be segmented copolymers or polysiloxane polymers. The terms silicone and siloxane are used interchangeably. The term "siloxane fluid" as used herein refers to polysiloxane fluids.

The term "unsaturated" when referring to functional groups, refers to a carbon-carbon multiple bond, typically a carbon-carbon double bond. When an unsaturated double bond is a terminal group, it is generally referred to as an ethylenically unsaturated group, which has the general structure $-CH=CH_2$. Ethylenically unsaturated groups are also sometimes called "free radically polymerizable groups". Examples of unsaturated groups are vinyl groups and (meth) acrylate groups.

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth) acrylate groups.

The term "curing" as used herein refers to a polymerization reaction in which reactive groups, either present in a molecule or generated by an activation mechanism, react to form a higher molecular weight molecule. This reaction may or may not involve crosslinking. The term "crosslinking" refers to a reaction that forms a polymeric matrix, where all of the component elements of the matrix are linked together such that none of the components contained within the matrix are extractable. While in the polymer arts the terms "curing" and "crosslinking" are used interchangeably, it should be noted that not all curing reactions involve crosslinking.

As used herein the term "polymer" refers to a macromolecule that is a homopolymer or a copolymer. As used herein, the term "homopolymer" refers to a polymeric material that is the reaction product of one monomer, and the term "copolymer" refers to a polymeric material that is the reaction product of at least two different monomers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl. Simple alkyl groups are abbreviated herein as methyl=Me, ethyl=Et, n-propyl=Pr.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl. The simple aryl group phenyl is abbreviated herein as Ph.

The term "alkoxy" refers to a monovalent group of formula —OR$^a$ where R$^a$ is an alkyl group.

The term "actinic radiation" as used herein refers to radiation that is capable of effecting curing. Actinic radiation includes Ultra-Violet (UV) radiation, gamma radiation and electron beam radiation.

The terms "room temperature" and "ambient temperature" are used interchangeably and refer to a temperature of from 20-25° C.

Disclosed herein are curable compositions that upon curing form gel adhesives that are suitable for use as medical adhesives. In some embodiments, the curable composition comprises a siloxane fluid with a viscosity of at least 1,000,000 centiPoise, a siloxane-(meth)acrylate co-polymer, and a siloxane tackifying resin. In some embodiments, the curable composition may further comprise an initiator. The curable composition, upon curing, forms a gel adhesive which comprises a crosslinked matrix and a fluid. In the gel adhesives of the current disclosure, the matrix is formed by crosslinking portions of the siloxane fluid with a viscosity of at least 1,000,000 centiPoise and the siloxane-(meth)acrylate co-polymer. The fluid comprises the siloxane fluid with a viscosity of at least 1,000,000 centiPoise that is not incorporated into the matrix. In this way, a curable composition that includes all of the desired components can be assembled and cured to form the desired adhesive gel.

A wide variety of siloxane fluids with a viscosity of at least 1,000,000 centiPoise are suitable for use in the curable compositions of this disclosure. Viscosity is measured at room temperature. The SI unit for viscosity is Pascal second (Pa s) where the conversion is 1 Pa s=1,000 centiPoise. The unit centipoise is used throughout the current disclosure as this unit is commonly used in the siloxane industry. Generally, the siloxane fluids that are useful in the current curable compositions are described by Formula 1 below:

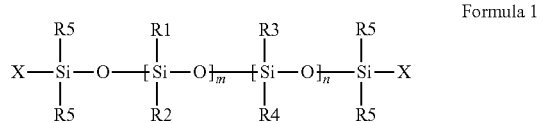

Formula 1 wherein R1, R2, R3, and R4 are independently selected from the group consisting of an alkyl group, an aryl group and a functional group, each R5 is an alkyl group, each X is a functional or a non-functional group, and n and m are integers, and at least one of m or n is not zero. In some embodiments, one or more of the alkyl or aryl groups may contain a halogen substituent, e.g., fluorine. For example, in some embodiments, one or more of the alkyl groups may be —CH$_2$CH$_2$C$_4$F$_9$.

Formula 1 can be used to describe both functionalized polysiloxanes and nonfunctional siloxanes. Examples of functionalized siloxanes that could be used include hydroxyl-functional polysiloxane; vinyl-functional polysiloxane; allyl-functional polysiloxane; and (meth)acrylate-functional polysiloxane. Examples of non-functional polysiloxanes are ones in which the group X is an alkyl group such as a methyl group. While functionalized polysiloxanes could be used, typically nonfunctional siloxane fluids are used.

In some embodiments, R1 and R2 are alkyl groups and n is zero, i.e., the material is a poly(dialkylsiloxane). In some embodiments, the alkyl group is a methyl group, i.e., poly(dimethylsiloxane) ("PDMS"). In some embodiments, R1 is an alkyl group, R2 is an aryl group, and n is zero, i.e., the material is a poly(alkylarylsiloxane). In some embodiments, R1 is methyl group and R2 is a phenyl group, i.e., the material is poly(methylphenylsiloxane). In some embodiments, R1 and R2 are alkyl groups and R3 and R4 are aryl groups, i.e., the material is a poly(dialkyldiarylsiloxane). In some embodiments, R1 and R2 are methyl groups, and R3 and R4 are phenyl groups, i.e., the material is poly(dimethyldiphenylsiloxane).

Particularly suitable siloxane fluids are ones in which R1, R2, R3, R4, R5, and X are all methyl groups, making the material a polydimethyl siloxane or PDMS fluid.

Recently, gentle to skin adhesives have been described in US Patent Publication No. 2011/0212325 (Determan et al.) that can be prepared from non-functionalized polysiloxane materials. These materials are ones described by Formula 1 with X=R5, and ones described by Formula 1 where X=OH. The materials where X=OH are considered to be "Non-functionalized materials" in this reference because the hydroxyl groups are not used as "functional groups", that is to say that the polymerization reaction does not involve reaction with the hydroxyl groups. These "non-functional materials" have been found to polymerize upon exposure to electron beam or gamma radiation generate siloxane networks. In addition to the non-functionalized polysiloxane materials (i.e. those materials of Formula 1 where X=R5 or OH), the functionalized polysiloxane materials described above were also found to be polymerized in this way to generate siloxane networks. In other words, this polymerization method was found to be very general and has the advantage of not requiring catalysts or initiators.

A wide variety of functionalized siloxanes are commercially available. Examples include not only terminal functionalized materials but also materials with pendant functional groups. Numerous examples of materials are commercially available from, for example, Gelest, Inc. Morrisville, PA, Dow Corning, Midland MI, and Wacker Chemie AG, Munich, Germany.

Many suitable silanol-terminated siloxane fluids are commercially available. Numerous examples of materials are commercially available from, for example, Gelest, Inc. Morrisville, PA, Dow Corning, Midland MI, and Wacker Chemie AG, Munich, Germany. Particularly suitable examples include the silanol terminated PDMS (polydimethyl siloxane), commercially available as XIAMETER OHX-4070, from Dow Corning, Midland, MI, and the hydroxyl functional PDMS commercially available as 350N from Wacker Chemie AG, Munich, Germany.

As used herein, "nonfunctional groups" are the same as defined in US Patent Publication No. 2011/0212325 (Determan et al.), namely either alkyl or aryl groups consisting of carbon, hydrogen, and in some embodiments, halogen (e.g., fluorine) atoms, or hydroxyl groups that are not involved with the polymerization reaction. As used herein, a "nonfunctionalized poly diorganosiloxane material" is one in which the R1, R2, R3, R4, R5, and X groups are nonfunctional groups.

Typically, the siloxane fluids with a viscosity of at least 1,000,000 centiPoise useful in the present disclosure are linear polysiloxanes, meaning that they have little or no branching. Additionally, the siloxane fluids are typically nonfunctional. Suitable nonfunctional polydiorgnanosiloxane materials include AK 1000000 SILICONE FLUID, EL polymer NA from Wacker Chemie AG, PMX-200 Silicone Fluids from Dow, TSF451-100M, Element14* PDMS 100k from Momentive, DMS-T25, DMS-T35, DMS-T72 from Gelest. Examples of particularly suitable siloxane fluids include AK 1000000 SILICONE FLUID from Wacker Chemie.

Besides the siloxane gel adhesives described above, siloxane-based pressure sensitive adhesives that contain a siloxane fluid have also been prepared and described in U.S. Pat. Nos. 7,807,268 and 7,407,709 (Zhou et al.). These compositions are somewhat different in that they do not comprise a crosslinked matrix and a fluid, but rather a siloxane polyurea pressure sensitive adhesive and a siloxane fluid. In some respects, the siloxane polyurea pressure sensitive adhesive behaves like a crosslinked matrix as the polyurea segments of these segmented copolymers form hydrogen bonding interactions which behave like pseudo crosslinks. The relatively high siloxane fluid levels within these adhesive compositions moderate the adhesive strength of the siloxane polyurea pressure sensitive adhesive which also decreases the shear strength of these adhesives. Therefore, the same methodology described above for increasing the shear strength of the adhesive composition without creating adhesives that damage the skin applies to this class of adhesive compositions as well.

The curable composition also comprises a siloxane-(meth)acrylate copolymer. A wide range of siloxane-(meth)acrylate copolymers are suitable. Typically, the siloxane-(meth)acrylate copolymer is the reaction product of a reaction mixture comprising at least one ethylenically unsaturated siloxane-containing macromer, at least one alkyl (meth)acrylate monomer, an optional reinforcing monomer, and an initiator. A particularly suitable method of preparing siloxane-(meth)acrylate copolymers is described in US Patent Publication No. 2011/0300296, which describes preparing the copolymers under essentially adiabatic polymerization conditions. Such polymerizations can be carried out without the use of solvent or with a minimum of solvent.

In this polymerization method, a wide variety of ethylenically unsaturated siloxane-containing monomers may be used. For example, a number of vinyl-functional siloxanes are commercially available. Particularly suitable are siloxane-containing macromers, especially ones with the general formula of Formula 2:

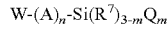

where W is a vinyl group, A is a divalent linking group, n is zero or 1, m is an integer of from 1 to 3; $R^7$ is hydrogen, lower alkyl (e.g., methyl, ethyl, or propyl), aryl (e.g., phenyl or substituted phenyl), or alkoxy, and Q is a monovalent siloxane polymeric moiety having a number average molecular weight above about 500 and is essentially unreactive under copolymerization conditions.

Such macromers are known and may be prepared by the method disclosed by Milkovich et al., as described in U.S. Pat. Nos. 3,786,116 and 3,842,059. The preparation of polydimethylsiloxane macromer and subsequent copolymerization with vinyl monomers have been described in several papers by Y. Yamashita et al., Polymer J. 14, 913 (1982); ACS Polymer Preprints 25 (1), 245 (1984); Makromol. Chem. 185, 9 (1984) and in U.S. Pat. No. 4,693,935 (Mazurek). This method of macromer preparation involves the anionic polymerization of hexamethylcyclotrisiloxane monomer to form living polymer of controlled molecular weight, and termination is achieved via chlorosilane compounds containing a polymerizable vinyl group.

The ethylenically unsaturated siloxane-containing monomer can be reacted with a wide range of (meth)acrylate monomers. (Meth)acrylate monomers are (meth)acrylate esters of non-tertiary alkyl alcohols, the alkyl groups of which comprise from about 1 to about 20, or about 1 to about 18 carbon atoms, such as those of Formula 3:

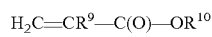

wherein $R^9$ is H or $CH_3$, the latter corresponding to where the (meth)acrylate monomer is a methacrylate monomer, and $R^{10}$ is a linear, branched, aromatic, or cyclic hydrocarbon group, and —C(O)— represents a carbonyl group. When $R^{10}$ is a hydrocarbon group, it can also include heteroatoms (e.g., oxygen or sulfur).

Examples of suitable (meth)acrylate monomers useful in the present disclosure include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

The reaction mixture also comprises at least one thermal initiator. Thermal initiators are species which generate free radicals upon heating. Many possible thermal free radical initiators are known in the art of vinyl monomer polymerization and may be used. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the VAZO compounds manufactured by DuPont, such as VAZO 52 (2,2'-azobis(2,4-dimethylpentanenitrile)), VAZO 64 (2,2'-azobis(2-methylpropanenitrile)), VAZO 67 (2,2'-azobis(2-methylbutanenitrile)), and VAZO 88 (2,2'-azobis (cyclohexanecarbonitrile)). Additional commercially available thermal initiators include, for example, LUPERSOL 130 (2,5-dimethyl-2,5-Di-(t-butylperoxy)hexyne-3) available from Elf Atochem, Philadelphia, PA, and LUPEROX 101 (2,5-dimethyl-2,5-di-(tert-butylperoxoxy) hexane) available from Arkema Canada, Inc., Oakville. In US Patent Publication No. 2011/0300296, the polymerization process is described in detail and in some embodiments includes a mixture of initiators.

The reaction mixture may optionally include a copolymerizable reinforcing monomer. Examples of such reinforcing monomers include acid functional monomers such as acid functional (meth)acrylates, and basic functional monomers such as (meth)acrylamides, substituted (meth)acrylamides, and amine-containing (meth)acrylates.

In most embodiments, acid functional monomers are used. Useful acidic functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability, typically ethylenically unsaturated carboxylic acids are used.

When acidic (meth)acrylate co-monomers are used, typically they are added in amounts ranging from about 2% by weight to about 30% by weight, or about 2% by weight to about 15% by weight, relative to the total monomer content. Generally, as the proportion of acidic monomers used in preparing the acidic copolymer increases, cohesive strength of the resulting polymer increases.

As mentioned above, a wide range of siloxane-(meth)acrylate copolymers are suitable in the adhesive compositions of this disclosure. In some embodiments, the siloxane-(meth)acrylate copolymers have a number average molecular weight of at least 3,000 grams/mole. In other embodiments, the siloxane-(meth)acrylate copolymers have a number average molecular weight of no more than 50,000 grams/mole. In some embodiments, the molecular weight ranges from 3,000-20,000 grams/mole, or even 10,000-15,000 grams/mole.

The curable composition also comprises a siloxane tackifying resin. A wide range of tackifying resins are suitable. Siloxane tackifying resins have in the past been referred to as "silicate" tackifying resins, but that nomenclature has been replaced with the term "siloxane tackifying resin". The siloxane tackifying resins are added in sufficient quantity to achieve the desired tackiness and level of adhesion. In some embodiments, a plurality of siloxane tackifying resins can be used to achieve desired performance.

Suitable siloxane tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary siloxane resins include MQ siloxane tackifying resins, MQD siloxane tackifying resins, and MQT siloxane tackifying resins. These siloxane tackifying resins usually have a number average molecular weight in the range of 100 to 50,000-gm/mole, e.g., 500 to 15,000 gm/mole and generally R' groups are methyl groups.

MQ siloxane tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in $HOSiO_{3/2}$ units (i.e., "$T^{OH}$" units), thereby accounting for some silicon-bonded hydroxyl content of the siloxane tackifying resin.

The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the siloxane tackifying resin. Such a reaction may be catalyzed, for example, with trifluoroacetic acid. Alternatively, trimethylchlorosilane or trimethylsilylacetamide may be reacted with the siloxane tackifying resin, a catalyst not being necessary in this case.

MQD siloxane tackifying resins are terpolymers having M, Q and D units. In some embodiments, some of the methyl R' groups of the D units can be replaced with vinyl ($CH_2$=CH—) groups ("$D^{Vi}$" units). MQT silicate tackifying resins are terpolymers having M, Q and T units.

Suitable siloxane tackifying resins are commercially available from sources such as Dow Corning (e.g., MQ-1600, MQ-1640), Momentive Performance Materials (e.g., SR545 and SR1000), and Wacker Chemie AG (e.g., BELSIL TMS-803).

The composition of the curable composition can be varied depending upon the desired properties of the adhesive gel formed upon curing. In some embodiments, curable composition comprises 63-80 parts by weight of at least one siloxane fluid with a viscosity of at least 1,000,000 centiPoise, 1-20 parts by weight of at least one siloxane-(meth)acrylate co-polymer, and 16-20 parts by weight of siloxane tackifying resin.

The curable compositions of this disclosure are curable to a siloxane gel adhesive comprising a siloxane-based crosslinked matrix and extractable siloxane fluid by a range of different polymerization methods. In some embodiments, the curable composition is cured by exposure to actinic radiation. In other embodiments, the curable composition further comprises a peroxide initiator, and the curable composition is cured by heating to trigger the peroxide initiator.

Typically, the curable composition is cured by exposure to actinic radiation. A variety of radiation sources are suitable, especially UV (ultraviolet), E-beam (electron beam), and gamma ray radiation. An advantage of E-beam and gamma ray radiation is that non-functional siloxane materials are curable in this way and no initiators or catalysts are required, as described, for example, in PCT Publication Nos. WO 2010/056541 and 2010/056543 (Liu et al.). Additionally, the level of crosslinking desired can be controlled by controlling the level of E-beam or gamma ray radiation used. Typically, E-beam radiation is used.

In embodiments where peroxide curing is used, a peroxide initiator is added to the curable composition. Upon heating the peroxide decomposes to form radicals which react with siloxane to form polymeric radicals. The polymeric radicals combine to form crosslinks. A wide variety of peroxides have been found to be suitable, such as di-acyl peroxides and peroxy esters containing substituted or unsubstituted alkyl or aryl groups.

Also disclosed herein are adhesive articles. The adhesive articles comprise a substrate with a first major surface and a second major surface, and a gel adhesive composition disposed on at least a portion of the first major surface of the substrate. In some embodiments, the gel adhesive composition comprises the cured reaction product of a curable composition comprising a siloxane fluid with a viscosity of at least 1,000,000 centiPoise, a siloxane-(meth)acrylate co-polymer, and a siloxane tackifying resin. Suitable curable compositions are described in detail above. In some embodiments, curable composition comprises 63-80 parts by weight of at least one siloxane fluid with a viscosity of at least 1,000,000 centiPoise, 1-20 parts by weight of at least one siloxane-(meth)acrylate co-polymer, and 16-20 parts by weight of siloxane tackifying resin. The curable composition is cured as described above.

A wide variety of substrates are suitable for the articles of this disclosure. In many embodiments, the substrate comprises a substrate suitable for use in a medical article. Examples of suitable substrates include a polymeric film, a fabric, a non-woven, a foam, a paper, a mesh, an adhesive, or a release liner. In some embodiments, the breathable conformable backing comprises a high moisture vapor permeable film backings. Examples of such backings, methods of making such films, and methods for testing their permeability are described, for example, in U.S. Pat. Nos. 3,645,835 and 4,595,001.

Generally, the backing is conformable to anatomical surfaces. As such, when the backing is applied to an anatomical surface, it conforms to the surface even when the surface is moved. Generally, the backing is also conformable to animal anatomical joints. When the joint is flexed and then returned to its unflexed position, the backing stretches to accommodate the flexion of the joint, but is resilient enough to continue to conform to the joint when the joint is returned to its unflexed condition.

Examples of particularly suitable backings can be found in U.S. Pat. Nos. 5,088,483 and 5,160,315, and include elastomeric polyurethane, polyester, or polyether block amide films. These films have a combination of desirable properties including resiliency, high moisture vapor permeability, and transparency.

A combination of substrate layers can also be used. For example, a backing substrate can be used in conjunction with a release liner, such that one surface of the gel adhesive is in contact with the backing substrate, and the other is contact with a release liner. Other combinations can also be used.

As mentioned above, one of the goals of the gel adhesive compositions is high adhesion with low skin trauma and high shear holding power. The properties of the adhesive articles can be measured in a variety of ways. Adhesion to skin can be difficult to measure for a variety of reasons since there is a wide range of skin types, so human skin is not a standard substrate surface as is for example a glass plate, stainless steel plate or polymeric plate. Additionally, conducting adhesion tests on human skin requires the use of panels of volunteers. This makes testing expensive and complicated. Additionally, while adhesion to human skin is a desired result, adhesive articles such as medical adhesive articles frequently are called upon to adhere to a wide range of substrates such as tubing, drapes, and the like. Thus, while adhesion to skin is one feature measured for articles of this disclosure, other testing protocols are also carried out to characterize the adhesive articles. Among the desired features for the gel adhesive articles of this this disclosure is to have a 180° Peel Adhesion value to stainless steel of at least 3.0 Newtons/inch when measured according to the testing procedures described in the Examples section. Another desirable feature for the gel adhesive articles of this disclosure is to have a Static Shear Holding Power value with a 500 gram weight of at least 10,000 minutes, when measured according to the testing procedures described in the Examples section.

The articles may include additional optional layers. In some embodiments, it may be desirable for there to be a primer layer between the substrate surface and the gel adhesive layer. Generally, the primer layer comprises materials that are commonly referred to as "primers" or "adhesion promoters". Primers and adhesion promoters are materials that are applied as thin coatings on a surface and strongly adhere to the surface and provide a modified surface chemistry to the surface. Examples of suitable coating materials include polyamides, poly(meth)acrylates, chlorinated polyolefins, rubbers, chlorinated rubbers, polyurethanes, siloxanes, silanes, polyester, epoxies, polycarbodiimides, phenolics, and combinations thereof.

In some embodiments, it may be desirable that the second major surface of the substrate, that is to say the surface on which the gel adhesive is not coated, have a low adhesion coating. This is especially true if the gel adhesive article is to be supplied in the form of a tape. Many tapes are supplied as rolls, where the adhesive layer contacts the non-adhesive "back" side of the backing upon being rolled up. Often this non-adhesive surface of the backing has a low adhesion or release coating on it to permit the roll to be unwound. These low adhesion coatings are often called "low adhesion backsizes" or LABs. Many factors control whether an LAB coating is necessary or desirable, including the nature of the adhesive, the composition and topography of the backing, and the desired use for the tape article.

The gel adhesive is disposed on a substrate, and the article may also include another substrate. The second substrate may be any of the substrates described above. For example, one major surface of the gel adhesive layer may be disposed on a substrate that is a tape backing, and the other major surface of the gel adhesive may be in contact with a release layer. In this way the release layer protects the adhesive layer until it is to be used. In other embodiments, the gel adhesive layer may be in contact with two release liners. This type of free-standing adhesive layer is typically referred to as a "transfer tape". Transfer tapes can be used to prepare a wide range of adhesive articles. For example, one release liner can be removed and the exposed adhesive surface laminated to a substrate to form a wide range of adhesive articles.

The gel adhesive may be of any suitable thickness, from quite thin to quite thick. In some embodiments, the thickness will be at least 10 micrometers (0.5 mil), up to 305 micrometers (12 mils), and in some embodiments the thickness will be from 25 micrometers (1 mil) up to 152 micrometers (6 mils), or even from 25 micrometers (1 mil) up to 102 micrometers (4 mils) thick. A wide range of intermediate thicknesses are also suitable.

The gel adhesive layer may be a continuous layer, or it may be a discontinuous layer. For example, the gel adhesive layer may be stripe coated such that stripes of gel adhesive are present on the first major surface of the substrate. In other embodiments, the gel adhesive may have through holes. Through holes are holes that pass through the entire thickness of the adhesive layer.

Also disclosed are methods for preparing gel adhesive articles. In some embodiments, the method comprises providing a substrate with a first major surface and a second major surface, providing a curable composition that upon curing forms a siloxane-based gel adhesive composition, disposing the curable composition on at least a portion of the first major surface of the substrate, and curing the curable composition. The curable composition comprises a siloxane fluid with a viscosity of at least 1,000,000 centiPoise, a siloxane-(meth)acrylate co-polymer, and a siloxane tackifying resin. The curable compositions are described in detail above. In some embodiments, curable composition comprises 63-80 parts by weight of at least one siloxane fluid with a viscosity of at least 1,000,000 centiPoise, 1-20 parts by weight of at least one siloxane-(meth)acrylate co-polymer, and 16-20 parts by weight of siloxane tackifying resin.

As mentioned above, the curing of the curable composition can be carried out in a variety of ways. In some embodiments, the curable composition further comprises a peroxide initiator, and the curable composition is cured by heating to trigger the peroxide initiator. In other embodiments, the curable composition is cured by exposure to actinic radiation.

In embodiments where peroxide curing is used, a peroxide initiator is added to the curable composition. Upon heating the peroxide decomposes to form radicals which react with siloxane to form polymeric radicals. The polymeric radicals combine to form crosslinks. A wide variety of peroxides have been found to be suitable, such as di-acyl peroxides and peroxy esters containing substituted or unsubstituted alkyl or aryl groups.

Typically, the curable composition is cured by exposure to actinic radiation. A variety of radiation sources are suitable, especially UV (ultraviolet), E-beam (electron beam), and gamma ray radiation. An advantage of E-beam and gamma ray radiation is that non-functional siloxane materials are curable in this way and no initiators or catalysts are required, as described, for example, in PCT Publication Nos. WO 2010/056541 and 2010/056543 (Liu et al.). Additionally, the level of crosslinking desired can be controlled by controlling the level of E-beam or gamma ray radiation used. Typically, E-beam radiation is used.

Commercially available electron beam generating equipment is readily available. An example of suitable equipment includes Model CB-300 electron beam generating apparatus (available from Energy Sciences, Inc. (Wilmington, MA) as well as the equipment described in the Examples section. Generally, a support film (e.g., polyester terephthalate support film) runs through a chamber. Generally, the chamber is inerted (e.g., the oxygen-containing room air is replaced with an inert gas, e.g., nitrogen) while the samples are e-beam cured.

Commercially available gamma irradiation equipment includes equipment often used for gamma irradiation sterilization of products for medical applications. In some embodiments, such equipment may be used to cure, or partially cure the gentle to skin adhesives of the present disclosure. In some embodiments, such curing may occur simultaneously with a sterilization process for a semi-finished or finished product, for example a tape or wound dressing.

Examples

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wisconsin unless otherwise noted. The following abbreviations are used: cm=centimeters; mm=millimeters; in =inch; RPM=revolutions per minute; kg=kilograms; lb=pounds; s=seconds; min=minutes; hrs=hours; kV=kiloVolts. The terms "weight %", "% by weight", and "wt %" are used interchangeably.

Test Methods

Peel Adhesion Test Procedure. The Peel Adhesion was measured according to the procedure described in ASTM D 3330 and DIN EN 1939. Peel adhesion was measured using a Zwick Allround Z005 Tensile Tester. The adhesive sample tape was slit to a width of 2.54 cm (1 inch) and a length of 25 cm. The resulting tape was then applied to a clean stainless steel panel (size: 5 cm×12 cm) using two passes of a 2 kg (4.5 lb) hard rubber roller with a speed of 50 mm/s. Prior to laminating the adhesive sample tape to the steel panel, this steel panel had been cleaned with n-Heptane and the adhesive sample tape had been conditioned at 23° C./50% relative humidity. Within a dwell time of 1 min the stainless steel panel with the applied adhesive sample tape was then mounted in the tensile tester and the tape was pulled off at a 180° peel angle at a crosshead speed of 300 mm/min (50 N loadcell). Results were measured in Newtons/inch, and the average peel data are reported. The test was performed at 23° C. and 50% relative humidity.

Shear Adhesion Test Procedure. The Static Shear Test was performed according to the procedure described in ASTM D3654 and BS EN 1943:2002. The adhesive sample tape with a length of 15 cm and a width of 2.54 cm (1 inch) was laminated to a stainless steel panel measuring 5 cm×12 cm such that the tape edges were coextensive with the edges of the panel. The panel overlapped 2.54 cm to cover the tape, and the free ends of the panel extended in opposite directions. The adhesive area of the tape being in contact to the stainless steel panel is 2.54 cm×2.54 cm. Prior to laminating the tape to the steel panel, this steel panel had been cleaned with n-Heptane and the adhesive sample tape had been conditioned at 23° C./50% relative humidity. The tape lamination to the steel was performed by overrolling the laminated area twice with a handroller with a mass of 2 kg at a speed of 10 mm/s. After a dwell time of 5 hrs the steel panel with the extended tape stripe was hung on a vertical rack. At the free bottom end of the extended tape stripe a clamp was applied to hold a weight of 500 g generating a constant shear force to the laminated adhesive area. After applying the 500 g load to the tape bottom end the time was monitored for up to 10,000 min. The time to failure (=holding time) was recorded in minutes. The test was performed at 23° C. and 50% relative humidity.

Examples

Procedure for Preparation of Siloxane-(meth)acrylate Copolymer. Polymers were prepared according to methods described in US 2018/148517, Examples 1-6.

Procedure for the Preparation of the Curable Composition. The appropriate amounts of Siloxane Fluid-1 and siloxane Tackifying Resin were added into a jar and mixed with a SpeedMixer DAC 150.1 FVZ (Hausschild, Germany) until a homogeneous mixture was obtained (mixing conditions: 4×30 seconds at 3500 rpm). Next, the Siloxane-(meth)

| Table of Abbreviations | |
|---|---|
| Abbreviation or Trade Designation | Description |
| Siloxane Fluid-1 | Wacker AK1,000,000 Silikonoel, Wacker Chemie AG, Germany |
| Tackifier Resin | MQ-Resin Powder 803TF, Wacker Chemie AG, Germany |
| PET Film | 3M polyethylene terephthalate film commercially available as SAM 18-0289, from 3M Company, St. Paul, MN | acrylate copolymer was added and the compound is mixed respectively at 350 rpm for 30 seconds until a homogeneous mixture was obtained.

Procedure for Coating Curable Composition. The curable composition was coated onto a polyester-coated nonwoven backing using a knife coater. The thickness of the coating was 100 micrometers (4 mils).

Procedure for E-Beam Curing. The coated curable composition was then attached to a PET film used as a web carrier, run through the inert chamber of an electron beam generating apparatus (PolymerPhysik GmbH & Co. KG, Tuebingen, Germany; now: Crosslinking AB, Sweden) and exposed to electron beam radiation using an acceleration voltage of 280 kV. The dose of E-beam exposure for each example is shown in Table 1.

Table 1 shows the composition and preparation conditions (E-beam dose) of examples 1~4 and of comparative examples C1 and C2. Moreover, Table 1 shows testing results according to procedures as described above.

TABLE 1

| Example | Siloxane Fluid-1 (wt %) | Tackifying Resin (wt %) | Siloxane-(meth)acrylate Copolymer (wt %) | E-beam Dose (MRad) | Peel Adhesion (N/in) | Shear Adhesion [min] |
|---|---|---|---|---|---|---|
| 1 | 75.2 | 18.8 | 6 | 3.6 | 3.15 | >10000 |
| 2 | 76 | 19 | 5 | 3.6 | — | 8534 |
| 3 | 77.6 | 19.4 | 3 | 3.5 | — | 6633 |
| 4 | 76 | 19 | 5 | 3.3 | — | 3435 |
| C1 | 80 | 20 | 0 | 3.4 | 2.91 | 1440 |
| C2 | 80 | 20 | 0 | 3.6 | 2.89 | 5250 |

What is claimed is:

1. A curable composition, comprising:
   63-80 parts by weight of at least one siloxane fluid with a viscosity of at least 1,000,000 centiPoise;
   1-20 parts by weight of at least one siloxane-(meth)acrylate co-polymer; and
   16-20 parts by weight of siloxane tackifying resin.

2. The curable composition of claim 1, wherein the siloxane-(meth)acrylate co-polymer comprises a reaction product of a reaction mixture, the reaction mixture comprising:
   at least one ethylenically unsaturated siloxane-containing macromer;
   at least one alkyl (meth)acrylate monomer; and
   an initiator.

3. The curable composition of claim 2, wherein the reaction mixture further comprises a reinforcing monomer selected from the group consisting of an acid-functional (meth)acrylate monomer and a base-functional (meth)acrylate monomer.

4. The curable composition of claim 1, wherein the at least one siloxane fluid with a viscosity of at least 1,000,000 centiPoise comprises a linear polydimethyl siloxane fluid.

5. The curable composition of claim 1, wherein the curable composition is curable to a siloxane gel adhesive comprising a siloxane-based crosslinked matrix and extractable siloxane fluid upon exposure to actinic radiation.

6. The curable composition of claim 1, wherein the curable composition further comprises a peroxide initiator.

7. A gel adhesive article comprising:
   a substrate with a first major surface and a second major surface; and
   a siloxane-based gel adhesive composition disposed on at least a portion of the first major surface of the substrate, wherein the siloxane-based gel adhesive composition comprises the cured reaction product of a curable composition comprising:
   a siloxane fluid with a viscosity of at least 1,000,000 centiPoise;
   a siloxane-(meth)acrylate co-polymer; and
   siloxane tackifying resin.

8. The gel adhesive article of claim 7, wherein the substrate comprises a polymeric film, a fabric, a non-woven, a foam, a paper, a mesh, an adhesive, or a release liner.

9. The gel adhesive article of claim 7, wherein the siloxane-(meth)acrylate copolymer comprises the reaction product of a reaction mixture comprising:
   at least one ethylenically unsaturated siloxane-containing macromer;
   at least one alkyl (meth)acrylate monomer; and
   an initiator.

10. The gel adhesive article of claim 9, wherein the reaction mixture further comprises a reinforcing monomer selected from an acid-functional (meth)acrylate monomer or a base-functional (meth)acrylate monomer.

11. The gel adhesive article of claim 7, wherein curable composition comprises:
   63-80 parts by weight of at least one siloxane fluid with a viscosity of at least 1,000,000 centiPoise;
   1-20 parts by weight of at least one siloxane-(meth)acrylate co-polymer; and
   16-20 parts by weight of siloxane tackifying resin.

12. The gel adhesive article of claim 7, wherein the gel adhesion article has a 180° Peel Adhesion value to stainless steel of at least 3.0 Newtons/inch.

13. The gel adhesive article of claim 7, wherein the gel adhesion composition has a Static Shear Holding Power value with a 500 gram weight of at least 10,000 minutes.

14. A method for preparing a gel adhesive article comprising:
   providing a substrate with a first major surface and a second major surface;
   providing a curable composition that upon curing forms a siloxane-based gel adhesive composition, wherein the curable composition comprises:
   a siloxane fluid with a viscosity of at least 1,000,000 centiPoise;
   a siloxane-(meth)acrylate co-polymer; and
   siloxane tackifying resin;
   disposing the curable composition on at least a portion of the first major surface of the substrate; and
   curing the curable composition to form siloxane-based gel adhesive.

15. The method of claim 14, wherein the siloxane-(meth)acrylate copolymer comprises the reaction product of a reaction mixture comprising:
   at least one ethylenically unsaturated siloxane-containing macromer;

at least one alkyl (meth)acrylate monomer; and
an initiator.

16. The method of claim 15, wherein the reaction mixture further comprises a reinforcing monomer selected from an acid-functional (meth)acrylate monomer or a base-functional (meth)acrylate monomer.

17. The method of claim 14, wherein curable composition comprises:
   63-80 parts by weight of at least one siloxane fluid with a viscosity of at least 1,000,000 centiPoise;
   1-20 parts by weight of at least one siloxane-(meth)acrylate co-polymer; and
   16-20 parts by weight of siloxane tackifying resin.

18. The method of claim 14, wherein curing the curable composition comprises exposure to actinic radiation.

19. The method of claim 14, wherein the curable composition further comprises a peroxide initiator, and wherein curing the curable composition comprises exposure to heat sufficient to activate the peroxide initiator.

20. A curable composition, comprising:
   a siloxane fluid with a viscosity of at least 1,000,000 centiPoise;
   a siloxane-(meth)acrylate co-polymer; and
   siloxane tackifying resin, wherein the curable composition is curable to a siloxane gel adhesive comprising a siloxane-based crosslinked matrix and extractable siloxane fluid upon exposure to actinic radiation.

21. A curable composition, comprising:
   a siloxane fluid with a viscosity of at least 1,000,000 centiPoise;
   a siloxane-(meth)acrylate co-polymer;
   siloxane tackifying resin; and
   a peroxide initiator.

* * * * *